US006771697B1

(12) United States Patent
Goldstein et al.

(10) Patent No.: US 6,771,697 B1
(45) Date of Patent: Aug. 3, 2004

(54) SPREAD SPECTRUM HANDSHAKE FOR DIGITAL SUBSCRIBER LINE TELECOMMUNICATIONS SYSTEMS

(75) Inventors: Yuri Goldstein, Southbury, CT (US); Yuri Okunev, Southbury, CT (US)

(73) Assignee: PCTel, Inc., Chicago, IL (US)

( * ) Notice: Subject to any disclaimer, the term of this patent is extended or adjusted under 35 U.S.C. 154(b) by 0 days.

(21) Appl. No.: 09/701,810

(22) PCT Filed: Jun. 18, 1999

(86) PCT No.: PCT/US99/13817

§ 371 (c)(1),
(2), (4) Date: Dec. 1, 2000

(87) PCT Pub. No.: WO99/67890

PCT Pub. Date: Dec. 29, 1999

Related U.S. Application Data

(60) Provisional application No. 60/090,333, filed on Jun. 23, 1998.

(51) Int. Cl.$^7$ .......................... H04B 15/00; H04K 1/00; H04L 27/30
(52) U.S. Cl. ...................... 375/222; 375/130
(58) Field of Search ................ 375/219, 220, 375/222, 259, 130, 140, 146, 147, 145, 149, 261, 268, 269, 272, 279, 283, 298, 295, 300, 303, 308; 370/525, 526

(56) References Cited

U.S. PATENT DOCUMENTS

| | | | | |
|---|---|---|---|---|
| 4,238,775 A | * | 12/1980 | Vandling | 358/439 |
| 4,716,407 A | * | 12/1987 | Borras et al. | 340/2.4 |
| 4,908,819 A | * | 3/1990 | Casady et al. | 370/204 |
| 5,596,604 A | | 1/1997 | Cioffi | 345/260 |
| 5,644,573 A | | 7/1997 | Bingham | 370/503 |
| 5,732,076 A | * | 3/1998 | Ketseoglou et al. | 370/347 |
| 5,751,701 A | | 5/1998 | Langberg | 370/281 |
| 5,883,907 A | | 3/1999 | Hoekstra | 371/37.11 |
| 5,909,463 A | | 6/1999 | Johnson | 375/220 |
| 6,169,761 B1 | * | 1/2001 | Marcoccia et al. | 375/132 |
| 6,272,121 B1 | * | 8/2001 | Smith et al. | 370/342 |
| 6,650,658 B1 | * | 11/2003 | Mueller et al. | 370/480 |

OTHER PUBLICATIONS

J. Makris, "DSL Services", Data Communications, Apr. 1998.
ANSI T1.413 –1998 "Network and Customer Installation Interfaces—Asymmetrical Digital Subscriber Line (ADSL) Metallic Interface", 248 pages.
"Proposal for G.hs Modulation Technique and Message Protocol", ITU–T Telecommunication Standardization Sector, C1–068 Chicago, USA Apr. 6–9, 1998.
Matsushita Electric Industrial Co. Ltd, "Proposed Working Text for G.hs Based on V.8bis", ITU–Telecommunication Standardization Sector, NF–044, Nice, France, May 11–14, 1998.
"Handshake procedures for Digital Subscriber Line (DSL) transceivers", ITU–T Draft G.994.1 (Feb. 3, 1999).
Matsushita Electric Industrial Co. Ltd., "Spectrum Considerations for G.hs", ITU–Telecommunications Standardization Sector, NF–045, Nice, France May 11–14, 1998.
Matsushita Electric Industrial Co., Ltd., "Crosstalk Model Proposed Working Text for G.hs Test" ITU–Telecommunications Standarization Sector, NF–046, Nice, France May 11–14, 1998.
General DataComm, Inc., Spread Spectrum G.hs Technique, WH–085, Waikiki, Hawaii, Jun. 29–Jul. 3, 1998.
NEC, "Desired Spectrum Range for G.hs under TCM–ISDN", ITU–Telecommunications Standardization Sector, NF–066, Nice, France May 11–14, 1998.
3Com, "Proposed Spectrum and Tone Selection for G.hs", ITU–Telecommunications Standardization Sector, NF–068, Nice, France May 11–14, 1998.
Jan W. M. Bergmans, Digital Baseband Transmission and Recording, Chapters 9 and 10, "Basics of Timing Recovery", "A Catalog of Timing Recovery Schemes", Kluwer Academic Publishers, Boston (1996) pp. 451–587.

* cited by examiner

*Primary Examiner*—Jean B. Corrielus
(74) *Attorney, Agent, or Firm*—Gordon & Jacobson, P.C.

(57) ABSTRACT

Handshake information for xDSL services is transmitted utilizing a spread spectrum modulated system where a plurality (n) of carrier tones (n>2) are summed and utilized as a spread spectrum carrier (SSC), and data is modulated onto the carrier (at all utilized frequencies). Preferably, phase shift keying (PSK) modulation or a variation thereof is used as the encoding/modulation technique.

37 Claims, 3 Drawing Sheets

SPREAD SPECTRUM HANDSHAKE FOR DIGITAL SUBSCRIBER LINE TELECOMMUNICATIONS SYSTEMS

This Application is a 371 of PCT/US9913817, filed on Jun. 18, 1999, which claims benefit of provisional application Serial No. 60/090,333 filed Jun. 23, 1998 which is hereby incorporated by reference in its entirety herein.

BACKGROUND OF THE INVENTION

1. Field of the Invention

The present invention relates broadly to telecommunications systems and methods. More particularly, the present invention relates to a handshake for an xDSL (Digital Subscriber Line type) modem.

2. State of the Art

Digital subscriber line (DSL) systems are a new and fast-growing data transmission service which provide significantly higher data rates than conventional V.34 and V.90 type modems. The abbreviation "xDSL" is an integrated designation for different DSL services including ADSL (asymmetric DSL), SDSL (symmetric DSL), RADSL (rate-adaptive DSL), HDSL (high speed DSL), and VDSL (very high speed DSL), UDSL (universal DSL), and their modifications such as ADSL-LITE (also known as G.lite). The xDSL services typically provide data rates of several Mbits/s downstream and several hundred Kbits/s upstream, although SDSL provides the same upstream and downstream rates. All types of DSL are based on discrete multitone (DMT) technology although they have different parameters. See, J. Makris, "DSL Services", *Data Communications*, April 1998, and ANSI T1.413-1995 "Network and Customer Installation Interfaces—Asymmetrical Digital Subscriber Line (ADSL) Metallic Interface".

According to the ITU-T telecommunications standards for the xDSL services, at modem start-up a handshake procedure (called G.hs) is utilized. The requirements for G.hs are set forth in several documents such as "Proposal for G.hs Modulation Technique and Message Protocol", *TTU-T Telecommunication Standardization Sector*, C1-068 Chicago, USA 6–9 Apr. 1998, and "Handshake procedures for Digital Subscriber Line (DSL) transceivers", ITU-T Draft G.994.1 (Feb. 3, 1999) which are both hereby incorporated by reference herein in their entireties. The main requirements of the handshake are: transmission of several tens of bytes during the handshake; signal compatibility with all types of DSL receivers; and interworking with the plain old telephone service (POTS), the integrated services digital network (ISDN), and time compression multiplexing ISDN (TCM-ISDN). Meeting these main requirements is not a trivial task because of considerable noise and cross-talk impairments, and lack of knowledge regarding the frequency characteristics of the channel, all of which is described in various papers such as: Matsushita Electric Industrial Co. Ltd, "Proposed Working Text for G.hs Based on V.8bis", *ITU-Telecommunication Standardization Sector*, NF-044, Nice, France, 11–14 May 1998; Matsushita Electric Industrial Co. Ltd., "Spectrum Considerations for G.hs", *TTU-Telecommunications Standardization Sector*, NF-045, Nice, France 11–14 May 1998; Matsushita Electric Industrial Co., Ltd., "Crosstalk Model Proposed Working Text for G.hs Test" *ITU-Telecommunications Standardization Sector*, NF-046, Nice, France 11–14 May 1998; NEC, "Desired Spectrum Range for G.hs under TCM-ISDN", *ITU-Telecommunications Standardization Sector*, NF-066, Nice, France 11–14 May 1998; and 3Com, "Proposed Spectrum and Tone Selection for G.hs", *ITU-Telecommunications Standardization Sector*, NF-068, Nice, France 11–14 May 1998.

More particularly, signal attenuation across lines carrying xDSL signals is a non-monotonic function of frequency, and may have several deep notches, while noise power spectral density (PSD) is also not a flat function of frequency. As a result, the signal to noise ratio (SNR) is a complex multi-extremes function of frequency. Moreover, the SNR is subject to random and cyclic variations in time. For example, in the TCM-ISDN environment which includes the so-called "ping-pong mode" of up-and down-transmissions, far-end cross-talk (FEXT) and near-end cross-talk (NEXT) interleave at a frequency of 400 Hz. Since FEXT and NEXT processes have significantly different power spectral densities, significant NEXT noise is introduced every other 1.25 milliseconds.

As set forth above, several authors have made proposals regarding G.hs techniques. The core of these proposals has been two-tone transmission with different bit rates depending upon the noise environment. Frequency diversity is provided by bits duplication on nominal and backup carrier tones. Time diversity is provided by increasing the symbol interval (i.e., decreasing the symbol rate). These proposals have several disadvantages. First, both the nominal and backup tones may be located in notches or other frequency domain areas having a low SNR, thus rendering the handshake ineffective. Second, increasing the symbol interval may not be sufficient to account for bursty noise. For example, in the TCM-ISDN environment, the signal to noise ratio may be below an acceptable level every other 1.25 ms interval. Even if the initial symbol interval of 0.232 ms were to be increased by a factor of four to 0.928 ms as suggested by one of the authors in the art, the entire interval could be located within the 1.25 ms high noise window. In fact, even increasing the symbol interval by a factor of 8 would still only provide a final symbol interval of 1.885 ms which could be 67% covered by the low SNR area.

SUMMARY OF THE INVENTION

It is therefore an object of the invention to provide a handshake for an xDSL modem which meets proposed xDSL standards requirements.

It is another object of the invention to provide a handshake for an xDSL modem which has excellent frequency diversity and time diversity and provides excellent reliability.

It is a further object of the invention to provide an xDSL modem handshake which utilizes multitone signaling.

It is an additional object of the invention to provide an xDSL modem handshake which will interwork with existing telecommunications services.

Another object of the invention is to provide modems and methods for implementing the above-listed objects.

In accord with the objects of the invention, handshake information for xDSL services are transmitted utilizing a spread spectrum modulated system where a plurality (n) of carrier tones (n>2) are summed and utilized as a spread spectrum carrier (SSC), and data is modulated onto the carrier (at all utilized frequencies). Preferably, phase shift keying (PSK) modulation (or a variation thereof such as BPSK—binary PSK, or DBPSK—differential binary PSK) is used as the modulating technique. When the spread spectrum carrier is modulated by handshake bits according to BPSK, the SSC is transmitted with sign "+" if the handshake bit is a +1 and with sign "−" if the handshake bit is a "−1". When using DPSK, the same modulation procedure is used for differentially encoded handshake bits.

According to one preferred aspect of the invention, the handshake symbol rate (SR) is set equal to 0.8A symbols/msec, where A is a positive integer. In order to improve reliability, symbols are preferably repeated at least four times. According to another preferred aspect of the invention, a preamble can be provided for timing recovery purposes. Further aspects of the invention include different receiver systems, including a quasicoherent receiver, an autocorrelation receiver, and a presently preferred incoherent receiver which utilizes coherent accumulation of FFT components for a DBPSK spread spectrum handshake signal.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
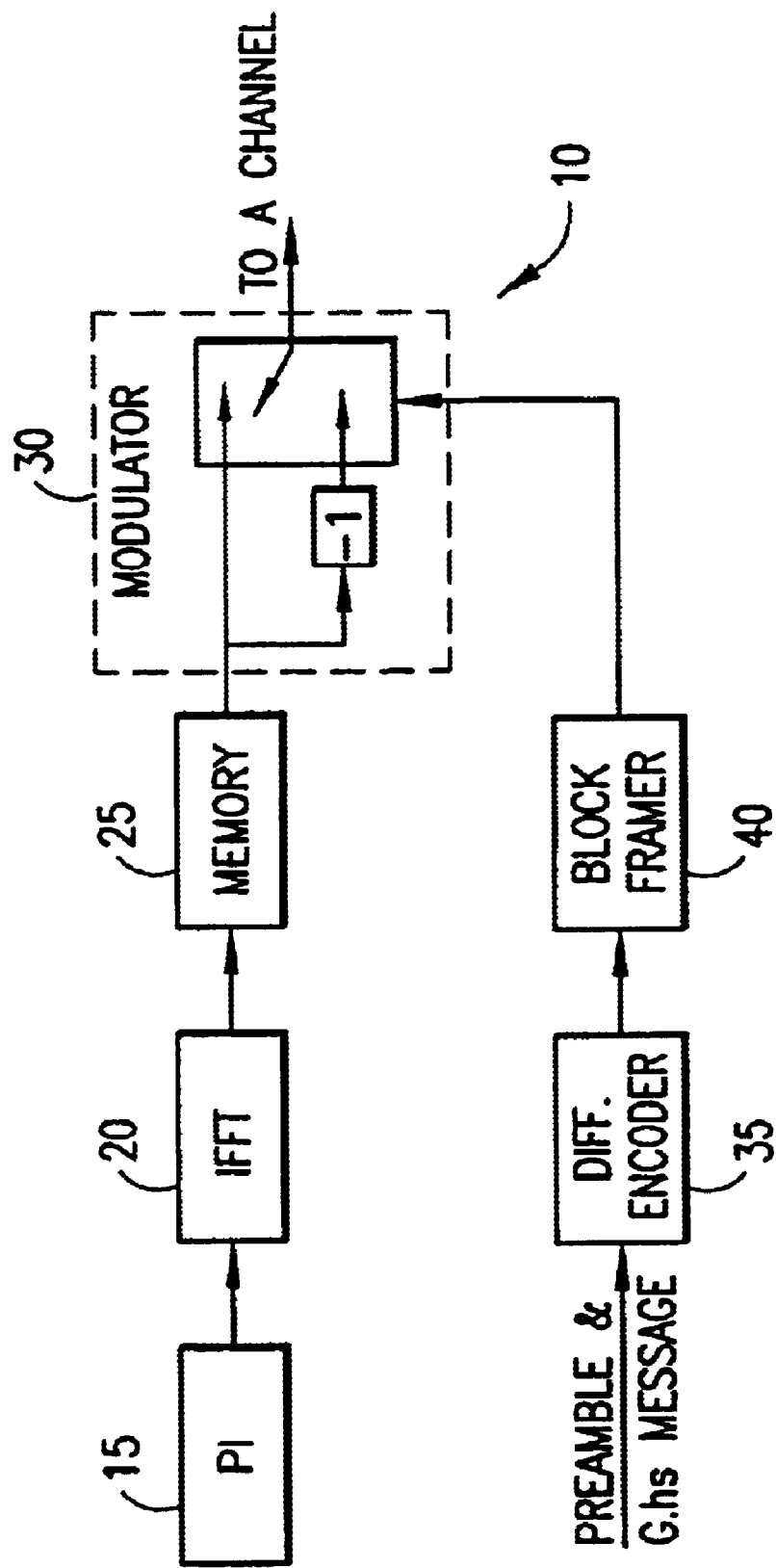
FIG. 1 is a block diagram of the preferred transmitter of the invention.

According to the invention, handshake information for xDSL services is transmitted by modulating the handshake information on a spread spectrum carrier (SSC), where the SSC is a sum of tones conventionally used by xDSL for the data transmission mode. As seen in FIG. 1, the transmitter 10 includes a phase initialization (PI) unit 15, an inverse fast Fourier transformation (IFFT) unit 20, a spread spectrum carrier (SSC) memory 25, a modulator 30, a differential encoder 35 and a block frame unit 40. In essence, the phase initialization unit 15 generates complex numbers indicating a desirable amplitude and initial phase distribution for a plurality of multitone signals. Preferably, the amplitude distribution is chosen to be flat (uniform). According to the preferred embodiment, the initial phases of different tones are generated randomly or selected specifically in order to minimize the crest-factor of the generated tones. Regardless, where DMT-style implementation is utilized, the IFFT transforms a set of complex numbers into a set of time-domain samples which are stored in memory 25. If, for example, all or substantially all two hundred fifty-six DMT tones (such as might be utilized in ITU-T Standard G.992.2) are generated by the PI unit 15, a five hundred twelve sample set may be stored in the memory 25. Additional repetitive samples may also be stored in the memory, if desired as a prefix which can be used by the receiver to reduce distortion. If desired, the samples may be generated in other manners (e.g., without the PI and IFFT, or in another apparatus) and loaded and stored in the transmitter memory for use as described below.

While all two hundred fifty-six DMT tones may be included in the spread spectrum carrier, it should be appreciated by those skilled in the art that according to the invention, different numbers of tones (and different tones) can be used in different circumstances, provided a spread spectrum carrier is utilized. Thus, for purposes of this application, a carrier may be considered a spread spectrum carrier if three or more distinct tones are modulated together. Thus, the SSC for a down-stream connection may contain a full or partial set of down-stream tones, while the SSC for an up-stream connection could contain a full or partial set of up-stream tones. For example, a G.Lite ADSL up-stream SSC might utilize allowed tones from the set six through thirty-two (25.875 kHz . . . 138 KHz), while the downstream SSC might utilize allowed tones from the set thirty-three through one hundred twenty-eight (142.3125 kHz . . . 552 kHz). The SSC may contain only even or odd tones to reduce the processing at the receiver.

Handshake information (as described below with reference to FIG. 2) which is to be modulated onto the spread spectrum carrier is provided to the differential encoder 35 and differentially encoded bits are written to the block frame unit 40. According to the preferred embodiment of the invention, the handshake information is provided to the differential encoder at a speed of 0.8 kbps, and differentially encoded 4-bit subblocks are written into registers of the block frame unit 40. Preferably, each 4-bit subblock is read four times such that each block frame is provided to the modulator 30 with a speed of 3.2 kbps.

When no differential encoder is utilized, the modulation technique is preferably is a binary phase shift keying (BPSK). When a differential encoder is utilized, the modulation technique is preferably a differential BPSK. Regardless, the modulator 30 uses the output of the block framer unit 40 to select whether the samples stored in the memory 25 are to be transmitted as is, or inverted (i.e., multiplied by −1 or 180 degrees out of phase). The samples stored in the memory 25 are sequentially read out of the memory so that all samples are modulated (i.e., transmitted as is or inverted) at the proposed symbol rate discussed below. When BPSK is utilized, the SSC samples are transmitted with sign "+" if the handshake bit is a "+1", and transmitted with sign "−" if the handshake bit is "−1" (or vice versa). When using DPSK, the same modulation procedure is used for differentially encoded handshake bits.

It will be appreciated by those skilled in the art that while BPSK or DBPSK modulation is preferred, other modulation techniques such as QPSK (quadrature PSK), DQPSK (differential QPSK), frequency modulation, amplitude modulation, and quadrature amplitude modulation could be utilized.

Figure 2:
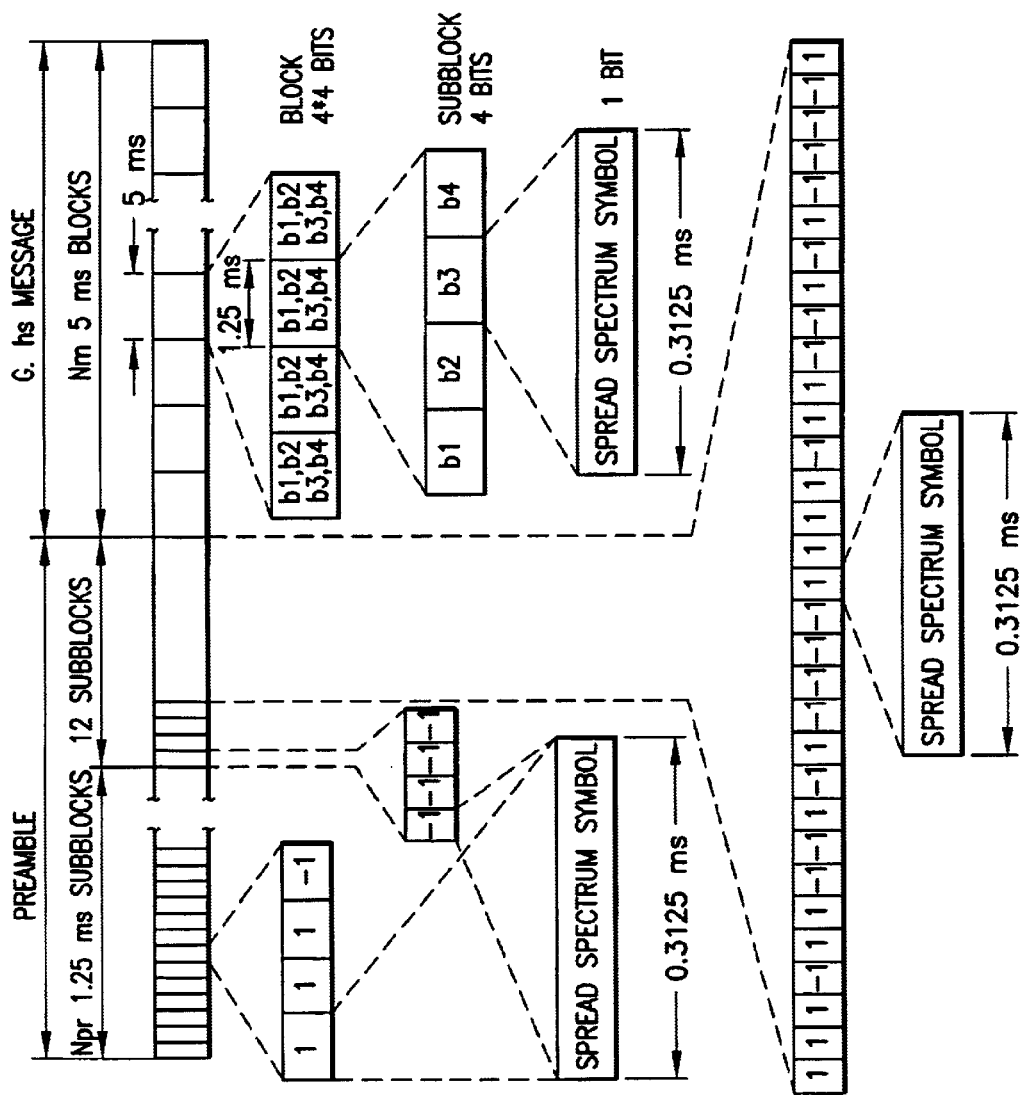
FIG. 2 is a diagram showing the signal structure of the preferred handshake signal of the invention.

Details of the handshake which modulates the SSC is seen in FIG. 2. According to the preferred embodiment of the invention, the handshake includes a preamble and a G.hs message. The preamble comprises N subblocks of a distinct four bit sequence "1,1,1,−1" followed by four subblocks of a four bit divider sequence "−1,−1,−1,−", followed by eight subblocks of a pseudorandom sequence (as specified). Each subblock is preferably generated at a 1.25 millisecond rate (i.e., each subblock has a duration of 1.25 ms), with bits being generated at a 0.3125 millisecond rate. After the preamble, the G.hs message is provided and preferably includes N blocks which are generated at a 5 millisecond rate. Each block preferably includes four subblocks of four information bits (symbols) each (b1, b2, b3, b4), with the four information bits being repeated four times (i.e., each subblock within the block contains the same material). Each symbol carries one information bit. So each block of duration 5 milliseconds, carries four information bits with redundancy 3/4. As indicated in FIG. 2, each bit of the preamble and G.hs message is preferably modulated onto a spread spectrum carrier. As discussed in more detail below, the preamble is preferably provided to permit the receiver to detect G.hs transmission, to recover the spread spectrum carrier for coherent processing, and for symbol and block synchronization (timing recovery). While the preamble is preferably modulated, an unmodulated preamble (all +1s) can be utilized.

According to the preferred embodiment of the invention, a symbol rate (SR) is set equal to 0.8 symbols/millisecond, where A=1,2,3 . . . . With the symbol rate set in this manner, an integer number of symbols will be placed within the 1.25 millisecond burst duration in the TCM-ISDN cross talk environment. Thus, when A=4 (bit rate=3200 bps), half a byte (four bits) will be transmitted within the 1.25 ms burst. When A=8 (bit rate=6400 bps), one byte will be transmitted within the 1.25 ms burst. By transmitting each symbol of the G.hs message at least four times, at least two symbol time-separated blocks will occur within the 1.25 ms high SNR FEXT areas in a TCM-ISDN cross-talk environment.

Taking into account the 400 Hz periodicity of the NEXT and FEXT cross-talk in TCM-ISDN systems, a noiseless time window may be found by calculating the correlation between N-symbol blocks delayed by 2.5 ms relative to each other. If the delayed blocks coincide with each other (i.e., they have not been corrupted by noise), the time window has a "high enough" SNR (i.e., it is "noiseless" for the purpose of the handshake) and can be used for receiving the handshake message. The structure of the preamble is particularly arranged to permit this determination.

Because the noiseless time window has a random time position relative to the transmission of the preamble and handshake message, received N-symbol blocks may be cyclically shifted. In other words, the block frame may not correspond to the noiseless time window frame. It is therefore preferred that this shift be estimated and eliminated. According to the preferred embodiment of the invention, the cyclic shift may be estimated and eliminated by transmitting an N-symbol reference block. Thus, the preamble is provided with a series of reference blocks having the form "1,1,1,−1". It should be appreciated that any shift of the reference block will be distinct (−1,1,1,1; 1,−,1,1; 1,1,−1,1) and detectable, and may therefore be detected and eliminated at the receiver. This pattern therefore allows for symbol synchronization and subblock synchronization.

Figure 3A:
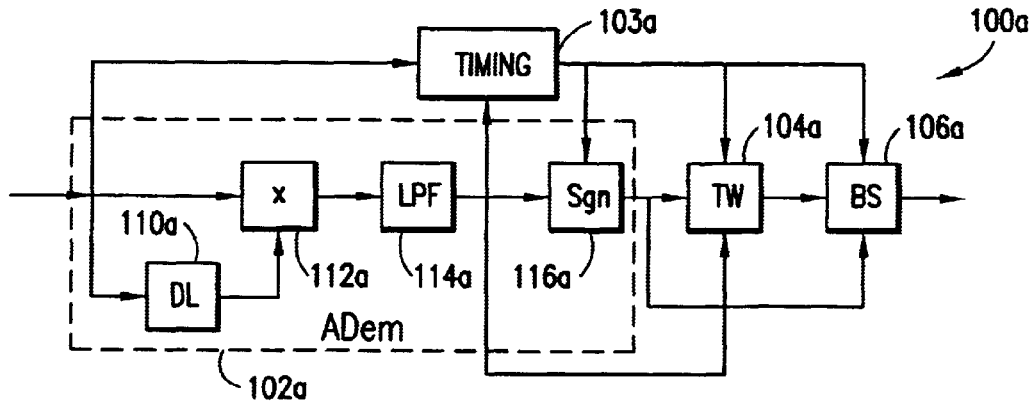
FIG. 3a is a block diagram of an autocorrelation receiver of DBPSK signals according to the invention.
Figure 3B:
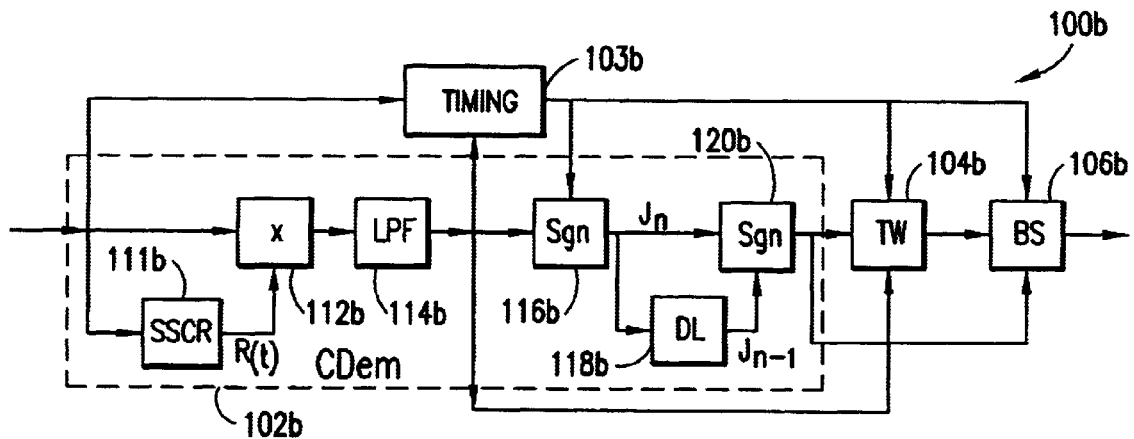
FIG. 3b is a block diagram of a quasicoherent receiver of DBPSK signals according to the invention.
Figure 3C:
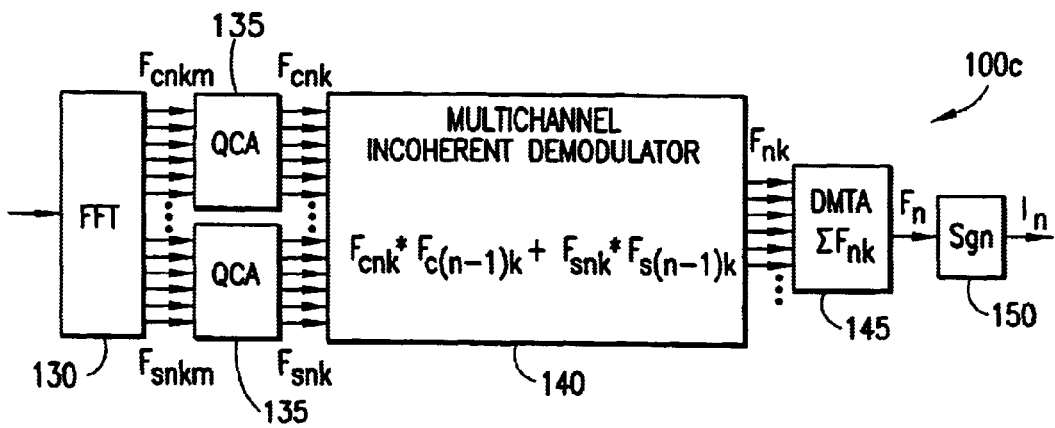
FIG. 3c is a block diagram of an incoherent receiver which utilizes coherent accumulation of FFT components for a DBPSK spread spectrum handshake signal according to the invention.

Turning now to FIGS. 3a–3c, three different receivers are shown for receiving and demodulating the handshake signal of the invention. An autocorrelation receiver 100a for DBPSK spread spectrum handshake signals is seen in FIG. 3a. The autocorrelation receiver 100a includes an autocorrelation demodulator 102a, a timing signal extractor 103a, and preferably further includes a noiseless time window (TW) determination unit 104a and a transmitted bit selection (BS) unit 106a. The autocorrelation demodulator 102a includes a delay line (DL) 110a, a multiplier 112a, a low pass filter (LPF) 114a, and a binary slicer (Sgn) 116a. Incoming SSC modulated signals are provided to the delay line 110a and the multiplier 112a. The delay Δt of the delay line is preferably set equal to 1/0.8A ms (i.e., the handshake symbol duration). Thus, the multiplier 112a multiplies the incoming signal with the delayed signal. The output is forwarded to the low pass filter 114a which is preferably provided with a frequency bandwidth Δf approximately equal to A/1.25 kHz. For example, when using block length A=4, Δt=0.3125 ms, and Δf=3.2 kHz. The output of the low pass filter 114a reflects the modulation function in the transmitter, and the sign function of the low pass filter output, as generated by the binary slicer 116a which compares the output to a zero threshold, corresponds to the transmitted bits.

As will be appreciated by those skilled in the art, the autocorrelation receiver 100a calculates (at the multiplier 112a) a scaler product $(S_n(t)*S_{n-1}(t))$ between a given spread spectrum signal $S_n(t)$ and a previous spread spectrum signal $S_{n-1}(t)$. The binary symbol $I_n$ received with the n-th symbol interval is therefore determined according to $I_n$=sgn $(S_n(t)*S_{n-1}(t))$.

As seen in FIG. 3a, the binary slicer 116a requires timing information which is preferably extracted from the low pass filter output by bandpass filtering of a frequency component responding to the baud (symbol) frequency. Alternatively (and also as shown in FIG. 3a, the timing information can be extracted from the incoming signal by a variety of well-known methods; e.g., as taught in Jan W. M. Bergmans, *Digital Baseband Transmission and Recording*, Chapters 9 and 10, "Basics of Timing Recovery", and "A Catalog of Timing Recovery Schemes", Kluwer Academic Publishers, Boston (1996) pp. 451–587.

While the autocorrelation demodulator 102a in conjunction with the timing extractor 103a suffices as a G.hs receiver in situations which do not require carrier recovery or other special synchronization, additional circuitry can be utilized if desired. Thus, if the channel noise has a steady power spectral density, robustness can be increased by accumulating signals at the output of the low pass filter, taking into account that every symbol may be repeated several times. In addition, if the PSD is known, the spread spectrum signal may be passed through a corresponding filter (not shown) at the input of the receiver in order to emphasize components of the spread spectrum signal having a higher SNR.

In addition, and according to the preferred embodiment of the invention, where a preamble is utilized, a noiseless time window determination unit 104a can be provided to compare the signal subblocks containing N symbols and delayed relative to each other by 2.5 ms. If the delayed N bit combination coincides within a certain time window, it indicates that this window has a sufficiently high SNR and can be used for receiving window has a sufficiently high SNR and can be used for receiving handshake bits. Regardless, the window determination unit 104 finds the time window of interest and generates an output signal indicating the time position of the desired window which is provided to the bit selection unit 106a. The demodulated bits provided at the output of the slicer during the noiseless window are also provided to the bit selection unit 106a, which determines from the bits and the window information the cyclic shift in effect. Thus, during receipt of the G.hs message, the bit selection unit 106a selects the correct portion of the received bits and eliminates the cyclic shift in the received information blocks. The bit selection unit 106a produces for output N bits every 5 milliseconds.

Turning to FIG. 3b, a quasicoherent receiver 100b for DBPSK spread spectrum handshake signals is shown. The quasicoherent receiver 100b includes an autocorrelation demodulator 102b, a timing signal extractor 103b, and preferably further includes a noiseless time window determination unit 104b and a transmitted bit selection unit 106b. The quasicoherent demodulator 102b includes a spread spectrum recovery (SSCR) unit 111b, a multiplier 112b, a low pass filter 114b, a binary slicer 116b, a delay line 118b, and a sign multiplier 120b. Incoming SSC modulated signals are provided to the spread spectrum carrier recovery unit 111b and the multiplier 112b. The spread spectrum carrier recovery unit 111b accumulates SSC samples during the preamble and extracts a spread spectrum reference signal R(t) therefrom. The multiplier 112b multiplies the incoming signal with the output of the SSC recovery unit. The output is forwarded to the low pass filter 114b which is preferably provided with a frequency bandwidth Δf approximately equal to N/1.25 kHz. The output of the low pass filter 114b is fed to slicer 116b which compares the output to a threshold (typically zero). The output of slicer 116b is a binary signal which is fed to the delay line 118b and to the sign multiplier 120b. The sign of the output of the sign multiplier 120b corresponds to the transmitted bits.

As will be appreciated by those skilled in the art, in the quasicoherent receiver 100b, the average unmodulated SSC, preferably extracted from the preamble by the SSC recovery unit 111b, is used as a spread spectrum reference signal R(t) for the coherent demodulation. Thus, the recovered binary symbol $I_n = J_n * J_{n-1}$, where $J_n = \text{sgn}(S_n(t)*R(t))$, and $J_{n-1} = \text{sgn}(S_{n-1}(t)*R(t))$. The quasicoherent receiver 100b provides excellent results, but is substantially more complicated to implement than the autocorrelation receiver 100a because of the SSC recovery unit 111b.

The functioning of the timing signal extractor 103b, and the time window determination unit 104b and bit selection unit 106b of the quasicoherent receiver 100b are substantially as described above with respect to corresponding elements of FIG. 3a.

Turning to FIG. 3c, an incoherent receiver 100c for DBPSK spread spectrum handshake signals is shown. As seen in FIG. 3c, the incoherent receiver includes a fast Fourier transform block 130, a quadrature component accumulation unit 135, a multichannel incoherent demodulator 140, a DMT accumulation unit 145, and a binary slicer 150. The FFT block 130 receives the time domain handshake signal and converts the signal into a frequency domain signal. The output of the FFT block are signals $F_{cnkm}$ and $F_{snkm}$ which are respectively, the real and complex parts for the k-th DMT tone at the m-th DMT symbol interval of the n-th handshake symbol. The quadrature component accumulation (QCA) unit 145 separately sums the real parts together and the imaginary parts together according to $$F_{cnk} = \sum_m F_{cnkm} \text{ and } F_{snk} = \sum_m F_{snkm}.$$

The outputs of the quadrature component accumulation unit 145 are then demodulated by the incoherent demodulator 140 according to $F_{nk} = F_{cnk} * F_{c(n-1)k} + F_{snk} * F_{s(n-1)k}$. The outputs of the incoherent demodulator 140 are then summed over all tones k by the DMT accumulator (DMTA) 145 according to $$F_n = \sum_k F_{nk}.$$

Finally, the output of the DMT accumulator 145 is provided to the binary slicer 150 in order to compare the output $F_n$ to a zero threshold. The decoded binary symbol $I_n = \text{sgn}(F_n)$.

It should be appreciated by those skilled in the art that the incoherent receiver 100c is relatively simple to implement because it is based on the use of a FFT which is already available in DMT-based systems. In addition, no frequency equalization (carrier phase recovery) is required, and the performance of the incoherent receiver 100c is nearly as good as the quasicoherent receiver 100b of FIG. 3b.

There have been described and illustrated herein methods and apparatus for implementing a spread spectrum handshake for a digital subscriber line telecommunications system. While particular embodiments of the invention have been described, it is not intended that the invention be limited thereto, as it is intended that the invention be as broad in scope as the art will allow and that the specification be read likewise. Thus, while a particular transmitter and particular receivers have been disclosed, it will be appreciated that other transmitters and receivers could be utilized, provided that the transmitter modulate a handshake signal onto a spread spectrum carrier. Thus the implementation of the transmitters and receivers will partially depend upon the encoding technique utilized (e.g., DPSK, QPSK, etc.), the results desired, and limitations or requirements of standards which might be applicable. Implementation of functions may also be accomplished in several manners. Thus, while slicers have been described for purposes of generating decoded binary signals, other apparatus well-known in the art could be utilized. Also, while a handshake sequence including a preamble and a handshake message have been described, it will be appreciated that different preambles and different handshake messages could be provided, and/or that a handshake sequence could be provided with no preamble. It will therefore be appreciated by those skilled in the art that yet other modifications could be made to the provided invention without deviating from its spirit and scope as so claimed.

We claim:

1. A digital subscriber line (DSL) type modem, comprising:
    a transmitter having
        a handshake generator which generates handshake signals,
        a spread spectrum carrier generator which generates a spread spectrum carrier including at least three tones associated with DSL type modems, and
        a modulator coupled to said handshake generator and to said spread spectrum carrier generator, said modulator modulating indications of said handshake signals onto indications of said spread spectrum carrier simultaneously.

2. A modem according to claim 1, wherein:
    said modulator modulates said indications of said spread spectrum carrier according to one of a phase shift keying (PSK) technique, frequency modulation, amplitude modulation, and quadrature amplitude modulation.

3. A modem according to claim 2, wherein:
    said PSK technique comprises one of binary PSK, differential binary PSK, quadrature PSK, and differential quadrature PSK.

4. A modem according to claim 1, wherein:
    said modulator modulates said indications of said spread spectrum carrier according to differential binary phase shift keying.

5. A modem according to claim 4, wherein:
    said spread spectrum carrier generator comprises memory which stores said indications of all said tones.

6. A modem according to claim 5, wherein:
    said indications comprise inverse fast Fourier transform (IFFT) samples of said at least three tones.

7. A modem according to claim 6, wherein:
    said indications comprise IFFT samples of substantially all two hundred fifty-six DMT tones associated with DSL type modems.

8. A modem according to claim 1, wherein:
said spread spectrum carrier generator comprises memory which stores said indications of all said tones.

9. A modem according to claim 8, wherein:
said indications of all said tones comprise inverse fast Fourier transform (IFFT) samples of said at least three tones.

10. A modem according to claim 9, wherein:
said indications of all said tones comprise IFFT samples of substantially all two hundred fifty-six DMT tones associates with DSL type modems.

11. A modem according to claim 1, wherein:
said handshake generator comprises a differential encoder coupled to a block framer.

12. A modem according to claim 1, wherein:
said handshake signals comprise a handshake message.

13. A modem according to claim 12, wherein:
said handshake message includes a plurality of blocks, each block having a plurality of repeating subblocks.

14. A modem according to claim 13, wherein:
said blocks have a 5 millisecond rate.

15. A modem according to claim 14, wherein:
said subblocks have a 1.25 millisecond rate, and each subblock contains four bits.

16. A modem according to claim 12, wherein:
said handshake signals further comprise a preamble.

17. A modem according to claim 16, wherein:
said preamble comprises a plurality of repeating subblocks.

18. A modem according to claim 17, wherein:
each said subblock has a 1.25 millisecond rate and includes four predetermined bits, said four predetermined bits selected to permit a shift in phase of said four predetermined bits to be detected.

19. A modem according to claim 17, wherein:
said preamble further includes at least one subblock having a divider sequence, and a plurality of subblocks representing a pseudorandom sequence.

20. A modem according to claim 1, further comprising:
a receiver having a demodulator.

21. A modem according to claim 20, wherein:
said receiver is chosen from a group consisting of an autocorrelation receiver, a quasicoherent receiver, and an incoherent receiver.

22. A modem according to claim 21, wherein:
said receiver is an autocorrelation receiver including a delay line which receives and delays a received handshake signal, a multiplier which multiplies said received handshake signal with an output of said delay line, a low pass filter which filters an output of the multiplier, and means for obtaining binary symbol indication from an output of said low pass filter.

23. A modem according to claim 21, wherein:
said receiver is a quasicoherent receiver including a spread spectrum carrier recovery unit generates a reference spread spectrum signal from a received signal, a multiplier which multiplies the received signal with said reference signal, a low pass filter which filters an output of the multiplier, and means for obtaining a binary symbol indication from an output of said low pass filter.

24. A modem according to claim 23, wherein:
said means for obtaining a binary symbol indication comprises a slicer coupled to an output of said low pass filter, a delay line which receives and delays outputs of said slicer, and a second multiplier which receives an output of said slicer and an output of said delay line and generates said binary symbol indication therefrom.

25. A modem according to claim 21, wherein:
said receiver is an incoherent receiver including a fast Fourier transformer (FFT) which receives an incoming time domain handshake signal and generates real and imaginary frequency domain signals therefrom, a quadrature component accumulation (QCA) unit coupled to said FFT which separately sums said real frequency domain signals together and said imaginary frequency domain signals together, an incoherent demodulator coupled to said QCA unit which combines said summed real and imaginary frequency domain signals, a discrete multitone accumulator (DMTA) coupled to said QCA unit which sums outputs of said QCA unit over said at least three tones, and means for generating a decoded binary symbol from an output of said DMTA.

26. A modem according to claim 20, wherein:
said handshake signals comprise a handshake message and a preamble, said preamble comprises a plurality of repeating subblocks, wherein said receiver includes means for utilizing said repeating subblocks to find a high-signal-to-noise time window.

27. A modem according to claim 26, wherein
said means for utilizing said repeating subblocks includes means for correlation of said repeating subblocks delayed relative to each other by a predetermined time interval.

28. A method of transmitting digital subscriber line (DSL) type modem handshake information, comprising:
generating handshake signals; and
modulating indications of said handshake signals onto a spread spectrum carrier, said spread spectrum carrier including at least three tones associated with DSL type modems, wherein said modulating comprises modulating said indications of said handshake signals onto indications of said at least three tones simultaneously.

29. A method according to claim 28, wherein:
said handshake signal indications are modulated onto said spread spectrum carrier according to one of a phase shift keying (PSK) technique, frequency modulation, amplitude modulation, and quadrature amplitude modulation.

30. A method according to claim 29, wherein:
said PSK technique comprises one of binary PSK, differential binary PSK, quadrature PSK, and differential quadrature PSK.

31. A method according to claim 28, wherein:
said handshake signal indications are modulated onto said spread spectrum carrier according to differential binary phase shift keying.

32. A method according to claim 28, further comprising:
generating said indications by taking an inverse fast Fourier transform (IFFT) of said at least three tones; and
storing said indications in memory, wherein said modulating comprises reading said indications from memory in order to modulate said indications of said handshake signals onto said indications stored in memory.

33. A method according to claim 28, wherein:
said handshake signals comprise a handshake message, said handshake message including a plurality of blocks, each block having a plurality of repeating subblocks.

34. A method according to claim 33, wherein:
said blocks have a 5 millisecond rate, said subblocks have a 1.25 millisecond rate, and each subblock contains four bits.

35. A method according to claim 33, wherein:
said handshake signals further comprise a preamble.

36. A method according to claim 33, wherein:
said preamble comprises a plurality of repeating subblocks, each said subblock has a 1.25 millisecond rate and includes four predetermined bits, said four predetermined bits selected to permit a shift in phase of said four predetermined bits to be detected.

37. A method according to claim 36, wherein:
said preamble further includes at least one subblock having a divider sequence, and a plurality of subblocks representing a pseudorandom sequence.

* * * * *